US012639453B2

(12) United States Patent     (10) Patent No.:   US 12,639,453 B2

Seo et al.     (45) Date of Patent:   May 26, 2026

(54) MEMORY SYSTEM AND METHOD OF OPERATING THE SAME

(71) Applicant: Samsung Electronics Co., Ltd., Suwon-si (KR)

(72) Inventors: Subin Seo, Suwon-si (KR); Jisoo Kim, Suwon-si (KR); Kyung-Woo Noh, Suwon-si (KR); Younsung Chu, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 51 days.

(21) Appl. No.: 18/678,216

(22) Filed: May 30, 2024

(65) Prior Publication Data

US 2025/0148093 A1   May 8, 2025

(30) Foreign Application Priority Data

Nov. 3, 2023   (KR) ......................... 10-2023-0151164

(51) Int. Cl.
*G06F 21/60*     (2013.01)

(52) U.S. Cl.
CPC .................................. *G06F 21/602* (2013.01)

(58) Field of Classification Search
CPC .... G06F 21/602; G06F 3/0604; G06F 3/0614; G06F 3/0658; G06F 2212/1016; G06F 2212/1032; G06F 2212/402
See application file for complete search history.

(56) References Cited

U.S. PATENT DOCUMENTS

| | | | |
|---|---|---|---|
| 9,049,005 B2 | 6/2015 | Cho et al. | |
| 9,342,466 B2 | 5/2016 | Shapiro | |
| 10,095,890 B2 | 10/2018 | Goto et al. | |
| 10,133,681 B2 | 11/2018 | Canepa et al. | |
| 10,698,840 B2 | 6/2020 | Gerhart et al. | |
| 2013/0223628 A1* | 8/2013 | Cho ...................... H04L 9/0861 | |
| | | | 380/277 |
| 2023/0071555 A1 | 3/2023 | Ogawa et al. | |
| 2023/0161896 A1 | 5/2023 | Ogura Iwasaki et al. | |
| 2023/0224153 A1* | 7/2023 | Avasarala ............... G06F 21/64 | |
| | | | 713/193 |

* cited by examiner

*Primary Examiner* — Sangseok Park
(74) *Attorney, Agent, or Firm* — Harness, Dickey & Pierce, P.L.C.

(57) ABSTRACT

Disclosed is a memory system which includes a non-volatile memory device, and a memory controller configured to control the non-volatile memory device. The memory controller includes a key index table including an extended key index associated with a logical address from a host device and an encryption/decryption key table including a replicated key index associated with the extended key index, and an encryption/decryption key associated with encryption or decryption of target data associated with the logical address. The memory controller is configured to change the replicated key index based on a key change request for the encryption/decryption key. Based on the encryption or the decryption being performed with respect to the target data, the memory controller is configured to compare the extended key index and the replicated key index to detect whether the encryption/decryption key associated with the encryption or the decryption is changed.

20 Claims, 14 Drawing Sheets

Figure 1:
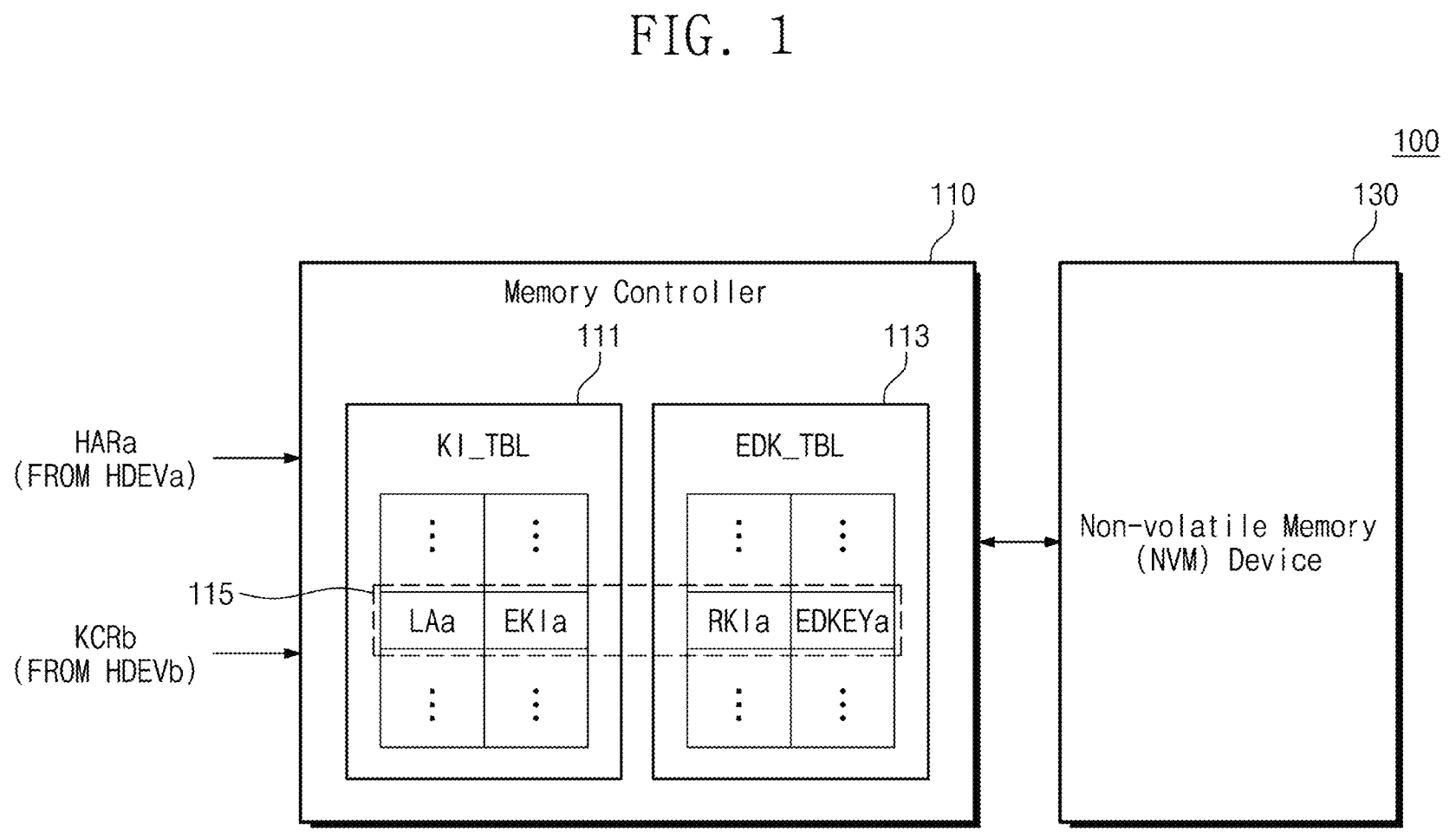

Non-volatile Memory (NVM) Device — 130

Memory Controller — 110

EDK_TBL — 113

| ... | ... |
|-----|-----|
| RKIa | EDKEYa |
| ... | ... |

KI_TBL — 111

| ... | ... |
|-----|-----|
| LAa | EKIa |
| ... | ... |

115

HARa (FROM HDEVa)

KCRb (FROM HDEVb)

FIG. 7

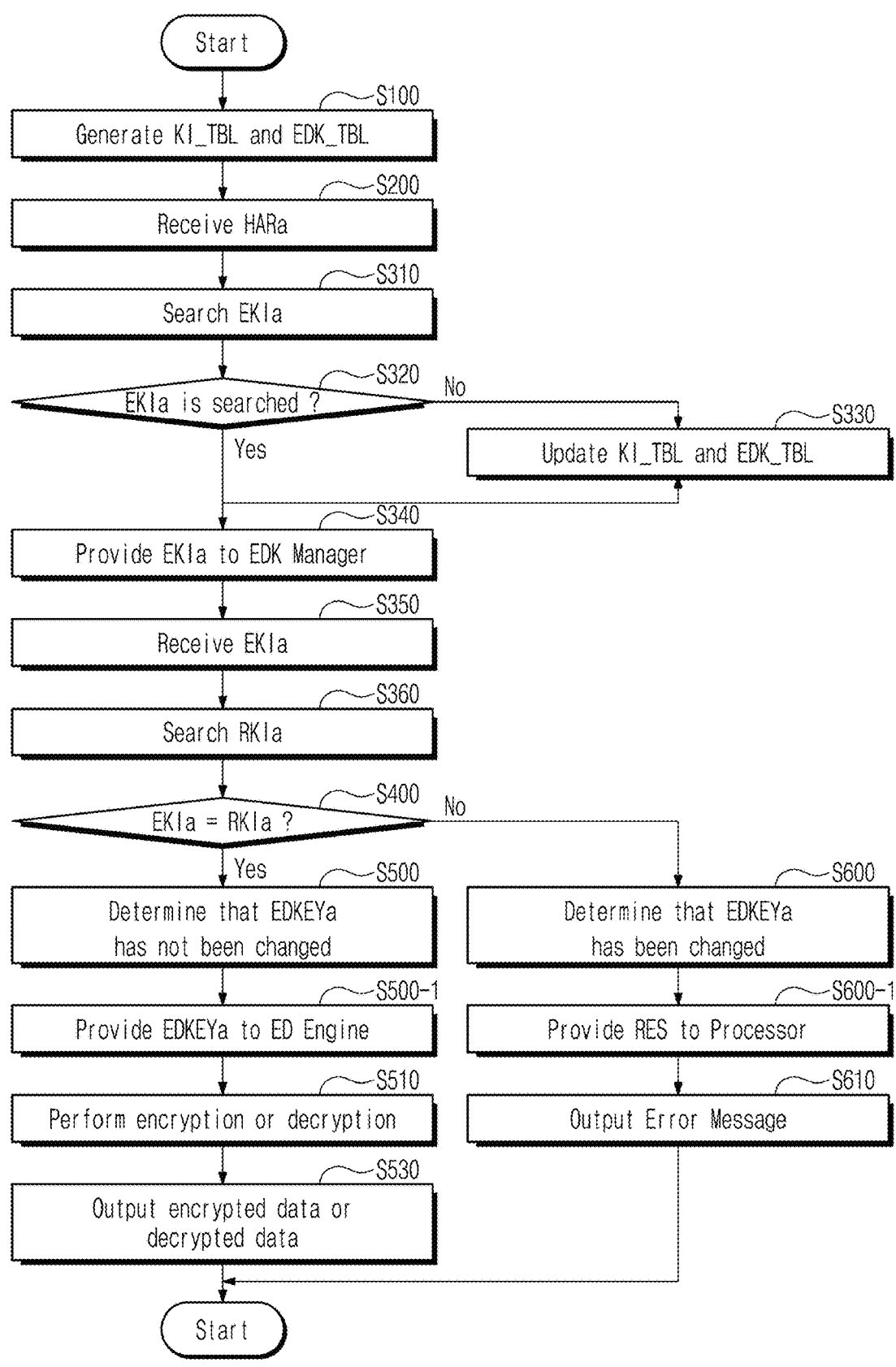

Start

Generate KI_TBL and EDK_TBL — S100

Receive HARa — S200

Search EKIa — S310

EKIa is searched ? — S320

No → Update KI_TBL and EDK_TBL — S330

Yes

Provide EKIa to EDK Manager — S340

Receive EKIa — S350

Search RKIa — S360

EKIa = RKIa ? — S400

No → Determine that EDKEYa has been changed — S600

Yes → Determine that EDKEYa has not been changed — S500

Provide EDKEYa to ED Engine — S500-1

Perform encryption or decryption — S510

Output encrypted data or decrypted data — S530

Provide RES to Processor — S600-1

Output Error Message — S610

Start

MEMORY SYSTEM AND METHOD OF OPERATING THE SAME

CROSS-REFERENCE TO RELATED APPLICATIONS

This application claims priority under 35 U.S.C. § 119 to Korean Patent Application No. 10-2023-0151164 filed on Nov. 3, 2023, in the Korean Intellectual Property Office, the disclosures of which are incorporated by reference herein in their entireties.

BACKGROUND

Embodiments of the present disclosure described herein relate to semiconductor devices, and more particularly, relate to memory systems and methods of operating the memory system.

Nowadays, an electronic device including a plurality of memory systems such as a solid state drive (SSD) is widely used in a server system. The memory system is expected to provide at least excellent safety, excellent endurance, a very fast information access speed, and low power consumption.

When an access request is received from a first host device, the memory system may perform encryption or decryption with respect to input/output data for the purpose of reinforcing security. However, even while the memory system performs the encryption or decryption according to the access request, a second host device may request a key change for requesting a change in an encryption/decryption key associated with the encryption or decryption. In this case, the key change request may be delayed until the encryption or decryption according to the access request is completed (or until the processing of the access request is completed). Due to the delay, other access requests newly received from the first host device may also be subsequently delayed.

SUMMARY

Embodiments of the present disclosure provide memory systems for efficiently processing an access request from a first host device and a key change request from a second host device.

Embodiments of the present disclosure provide methods of operating the memory system.

According to some example embodiments, a memory system includes a non-volatile memory device, and a memory controller configured to control the non-volatile memory device. The memory controller includes a key index table including an extended key index associated with a logical address from a host device and an encryption/decryption key table including a replicated key index associated with the extended key index, and an encryption/decryption key associated with encryption or decryption of target data associated with the logical address. The memory controller is configured to change the replicated key index based on a key change request for the encryption/decryption key. Based on the encryption or the decryption being performed with respect to the target data, the memory controller is configured to compare the extended key index and the replicated key index to detect whether the encryption/decryption key associated with the encryption or the decryption is changed.

According to some example embodiments, a memory system includes a non-volatile memory device, and a memory controller configured to control the non-volatile memory device. The memory controller includes a key index manager configured to manage a key index table including an extended key index associated with a logical address from a host device, an encryption/decryption key manager configured to manage an encryption/decryption key table including a replicated key index associated with the extended key index, and an encryption/decryption key associated with encryption or decryption of target data associated with the logical address, an encryption/decryption engine configured to perform the encryption or the decryption of the target data based on the encryption/decryption key, and a processor. Based on the encryption or the decryption of the target data being performed, the processor configured to detect whether the encryption/decryption key associated with the encryption or the decryption is changed, by detecting whether the replicated key index is changed.

According to some example embodiments, a method of operating a memory system includes generating a key index table and an encryption/decryption key table, the key index table including an extended key index associated with a logical address from a host device, and the encryption/decryption key table including a replicated key index associated with the extended key index and an encryption/decryption key associated with encryption or decryption of target data associated with the logical address, changing the replicated key index based on a key change request for the encryption/decryption key, and compare the extended key index and the replicated key index to detect whether the encryption/decryption key associated with the encryption or the decryption is changed, based on the encryption or the decryption of the target data being performed.

BRIEF DESCRIPTION OF THE FIGURES

The above and other objects and features of the present disclosure will become apparent by describing in detail embodiments thereof with reference to the accompanying drawings.

FIG. 1 is a block diagram illustrating a memory system according to some example embodiments of the present disclosure.

FIG. 7 is a flowchart illustrating a method of operating a memory system according to some example embodiments of the present disclosure.

DETAILED DESCRIPTION

Figure 2:
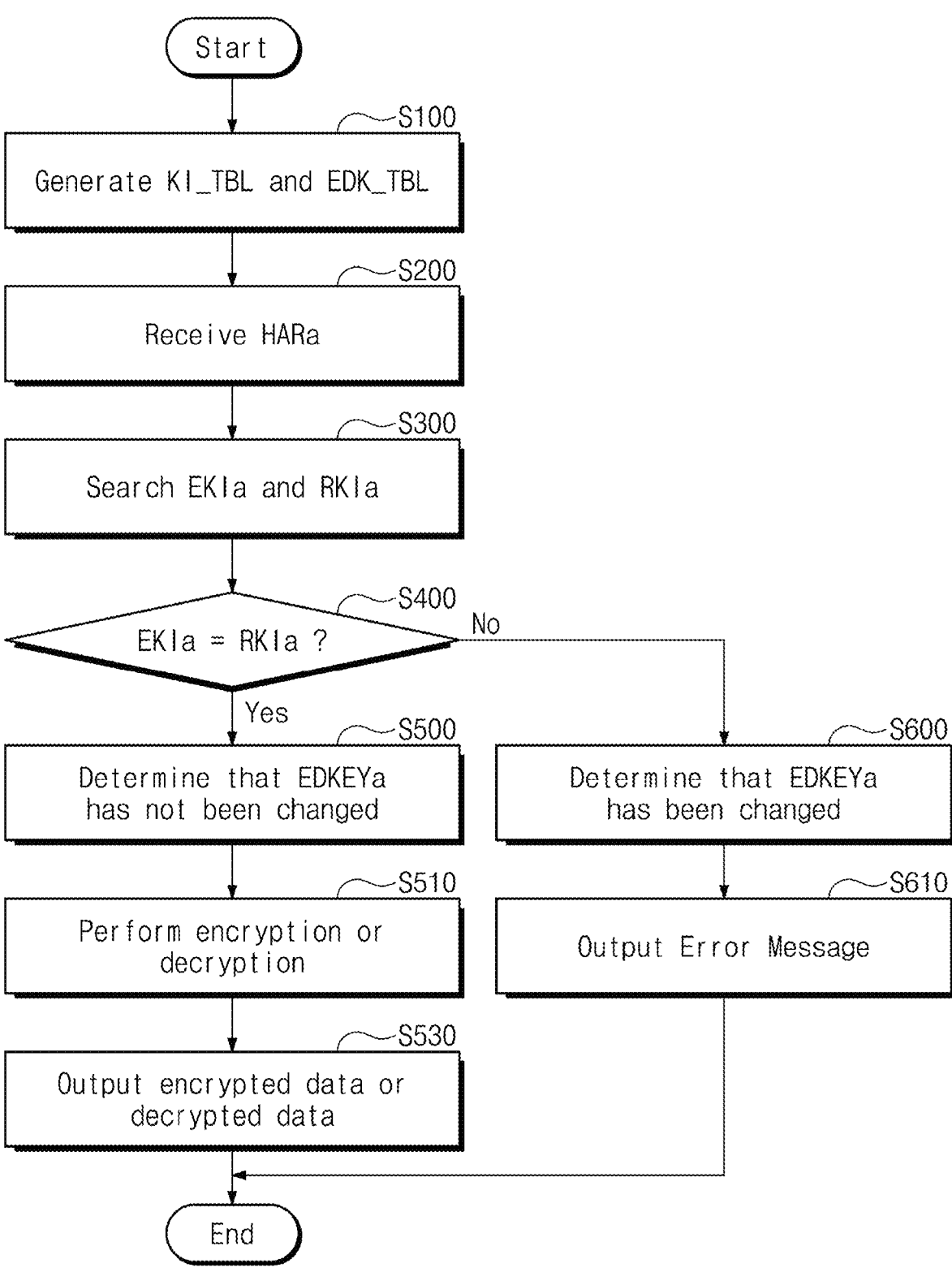
FIG. 2 is a flowchart illustrating a method of operating a memory system of FIG. 1.

Below, embodiments of the present disclosure will be described in detail and clearly to such an extent that one skilled in the art easily carries out the present disclosure.

FIG. 1 is a block diagram illustrating a memory system according to some example embodiments of the present disclosure.

Referring to FIG. 1, a memory system 100 may be used in a server system and may be shared by a plurality of host devices. For example, the memory system 100 may receive access requests capable of including a write request, a read request, and an erase request from the plurality of host devices and may store, read, or erase pieces of data corresponding to the access requests. For example, a host device may transmit logical addresses and requests associated with the access requests to a memory system and may exchange or erase pieces of data.

When an access request is received from a first host device, the memory system 100 may perform encryption or decryption with respect to input/output data for the purpose of reinforcing security; when a key change request requesting to change an encryption/decryption key associated with the encryption or the decryption is received from a second host device, the memory system 100 may change the encryption/decryption key according to the key change request even while performing the encryption or the decryption. For example, operations of the memory system 100 according to an access request (for example, the request HARa) from a first host device (for example, the host device HDEVa) and operations of the memory system 100 according to a key change request (for example, the key change request KCRb) from a second host device (for example, the host device HDEVb) may be performed in parallel and independently.

In some example embodiments, the key change request may include a crypto-erase request for changing a target encryption/decryption key targeted for key change such that pieces of data associated with the target encryption/decryption key are erased.

The memory system 100 may include a memory controller 110 and a non-volatile memory (NVM) device 130, and the memory controller 110 may overall control operations of the non-volatile memory device 130.

The memory controller 110 may include a key index table (KI_TBL) 111 and an encryption/decryption key table (EDK_TBL) 113; based on the key index table 111 and the encryption/decryption key table 113, the memory controller 110 may perform encryption or decryption according to the access request or may change an encryption/decryption key associated with the encryption or the decryption depending on the key change request.

In some example embodiments, the key index table 111 may include an extended key index EKIa associated with a logical address LAa from a host device. The encryption/decryption key table 113 may include a replicated key index RKIa and an encryption/decryption key EDKEYa associated with the extended key index EKIa. The encryption/decryption key EDKEYa may be an encryption key or a decryption key for encryption or decryption of target data associated with the logical address LAa. For example, the extended key index EKIa, the replicated key index RKIa, and the encryption/decryption key EDKEYa may be associated with the logical address LAa. For example, the extended key index EKIa, the replicated key index RKIa, and the encryption/decryption key EDKEYa may be controlled as one group for encryption or decryption of pieces of data associated with the logical address LAa or for a change in an encryption/decryption key (for example, the values 115), but to implement technical effects of embodiments of the present disclosure, the extended key index EKIa may be controlled so as to be managed in the key index table 111 and the replicated key index RKIa and the encryption/decryption key EDKEYa may be controlled so as to be managed in the encryption/decryption key table 113. For example, an entry of the encryption/decryption key table 113, in which the replicated key index RKIa and the encryption/decryption key EDKEYa are stored (or placed) and an entry of the key index table 111, in which the extended key index EKIa is stored (or placed), may be identical to each other or may correspond to each other.

In some example embodiments, the memory controller 110 may change the replicated key index RKIa based on the key change request for the encryption/decryption key EDKEYa; in the case of performing encryption or decryption of the target data associated with the logical address LAa, the memory controller 110 may compare the extended key index EKIa and the replicated key index RKIa and may detect whether the encryption/decryption key EDKEYa associated with the access is changed (or whether the encryption/decryption key EDKEYa is valid).

For example, in the key index table 111 and the encryption/decryption key table 113, the replicated key index RKIa may be the same as the extended key index EKIa at a point in time when the extended key index EKIa and the replicated key index RKIa associated with the logical address LAa are generated for the first time. For example, while the memory controller 110 performs encryption or decryption with respect to pieces of target data associated with the logical address LAa by using the encryption/decryption key EDKEYa in response to an access request of a first host device associated with the logical address LAa, when the key change request for the encryption/decryption key EDKEYa is received from a second host device, the memory controller 110 may change the replicated key index RKIa while maintaining the extended key index EKIa and may change the encryption/decryption key EDKEYa while changing the replicated key index RKIa. In this case, when the memory controller 110 performs encryption or decryption according to the access request associated with the logical address LAa, the memory controller 110 may only compare the extended key index EKIa and the replicated key index RKIa and may immediately detect whether the encryption/decryption key EDKEYa is changed. How to change the replicated key index RKIa will be described with reference to FIGS. 5 and 8B, and how to compare the replicated key index RKIa and the extended key index EKIa will be described with reference to FIGS. 2, 7, and 8C.

For example, when the memory controller 110 searches the extended key index EKIa associated with the logical address LAa from the key index table 111, the memory controller 110 may search the replicated key index RKIa associated with the extended key index EKIa from the encryption/decryption key table 113. When the replicated key index RKIa is the same as the extended key index EKIa, the memory controller 110 may perform the encryption or the decryption based on the encryption/decryption key EDKEYa; when the replicated key index RKIa is different from the extended key index EKIa, the memory controller 110 may output an error message.

According to the above configuration, a memory system according to some example embodiments of the present disclosure may independently manage an extended key index and a replicated key index associated with a specific logical address in different tables. When an access request associated with a specific logical address is received from a first host device, the memory system may perform encryption or decryption with respect to pieces of data associated with the logical address based on an extended key index and a replicated key index associated with the logical address When an encryption/decryption key associated with the encryption or the decryption is changed depending on a key change request from a second host device, the memory system may compare the extended key index and the replicated key index and may immediately detect whether the encryption/decryption key is changed. Based on a result of the detection, the memory system may continuously perform the encryption or the decryption or may output an error message. The operation in which the memory system outputs the error message may satisfy the standard specification associated with the memory system. Accordingly, the memory system may efficiently process an access request from a first host device and a key change request from a second host device and may efficiently reduce delays due to the access request or the key change request.

For example, according to some example embodiments, there may be an increase in speed, accuracy, and/or power efficiency of the memory device based on the above methods. Therefore, the improved devices and methods overcome the deficiencies of the conventional devices and methods of managing data and data security related to multiple host devices and a memory device while reducing resource consumption, improving data accuracy, and resource allocation (e.g., latency). Further, there is an improvement in communication and reliability in the device by providing the abilities disclosed herein.

FIG. 2 is a flowchart illustrating a method of operating a memory system of FIG. 1.

Referring to FIG. 2, a memory system (for example, the memory system 100 of FIG. 1) may generate a key index table KI_TBL (for example, the key index table 111 of FIG. 1) and an encryption/decryption key table EDK_TBL (for example, the encryption/decryption key table 113 of FIG. 1) (S100).

In some example embodiments, the key index table KI_TBL may include the extended key index EKIa associated with a logical address from a host device, and the encryption/decryption key table EDK_TBL may include the replicated key index RKIa associated with the extended key index EKIa and the encryption/decryption key EDKEYa associated with encryption or decryption of target data associated with the logical address.

The memory system may receive an access request HARa including the logical address from any host device (S200), and may search the extended key index EKIa and the replicated key index RKIa associated with the logical address from the key index table KI_TBL and the encryption/decryption key table EDK_TBL (S300).

In some example embodiments, an entry of the encryption/decryption key table EDK_TBL, in which the replicated key index RKIa is stored and an entry of the key index table KI_TBL, in which the extended key index EKIa is stored, may be identical to each other or may correspond to each other. The memory system may search the replicated key index RKIa by identifying a specific entry of the key index table KI_TBL, which is identical to or correspond to the entry where the extended key index EKIa is stored, from the encryption/decryption key table EDK_TBL.

The memory system may compare the extended key index EKIa and the replicated key index RKIa (S400).

When the replicated key index RKIa is identical to the extended key index EKIa (Yes in operation S400), the memory system may determine that the encryption/decryption key EDKEYa associated with the encryption or the decryption of the target data is not changed (S500), may perform the encryption or the decryption (S510), and may output encrypted data or decrypted data based on the encryption or the decryption (S530).

When the replicated key index RKIa is different from the extended key index EKIa (No in operation S400), the memory system may determine that the encryption/decryption key EDKEYa is changed (S600) and may output an error message (S610).

In some example embodiments, the operation in which the memory system outputs the error message may satisfy the standard specification associated with the memory system. For example, the standard specification may be 5.5.5 of the TCG (Trusted Computing Group) SIIS (Storage Interface Interactions Specification) Version 1.08, and the memory system may support the "termination by a controller" disclosed in the standard specification by the output of the error message.

An example in which operation S100 is performed before operation S200 and operation S300 is illustrated in FIG. 2, but the present disclosure is not limited thereto. When a result of performing operation S300 indicates that the extended key index EKIa and the replicated key index RKIa associated with the logical address are not found from the key index table KI_TBL and the encryption/decryption key table EDK_TBL, the memory system may perform operation S100 and may generate a new entry including the extended key index EKIa and the replicated key index RKIa associated with the logical address in the key index table KI_TBL and the encryption/decryption key table EDK_TBL. For example, after operation S300 is performed, operation S100 may be performed before performing operation S400.

Figure 3:
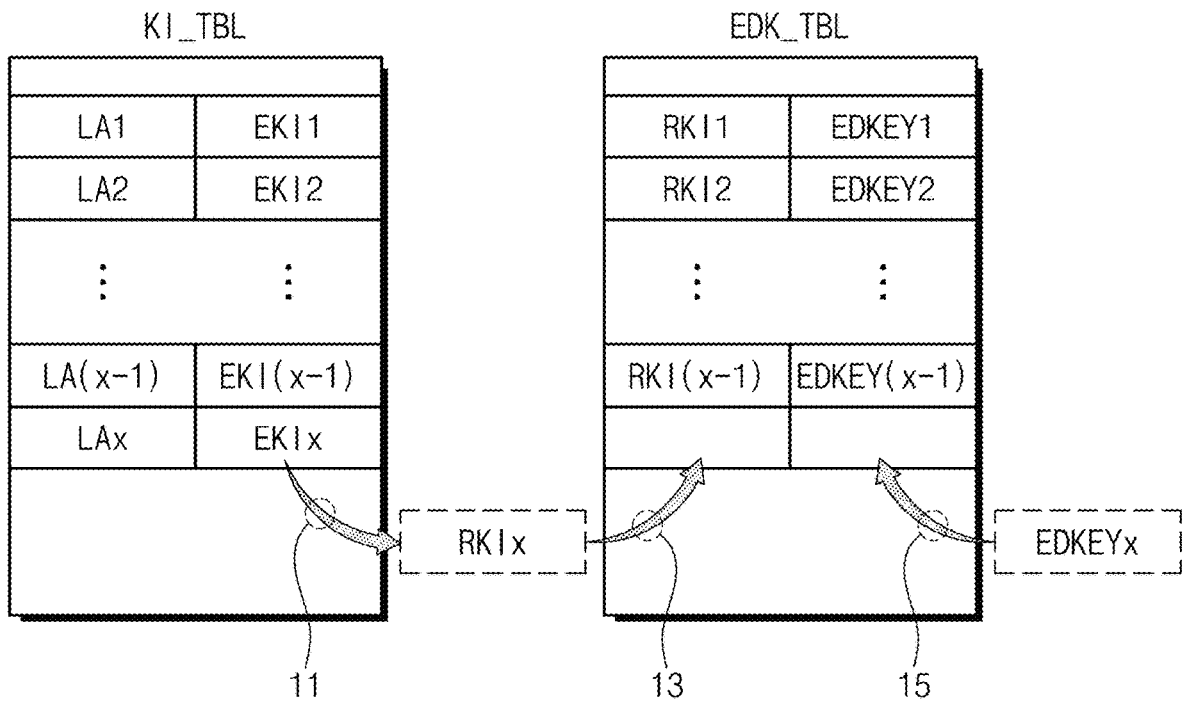
FIG. 3 is a diagram for describing some example embodiments in which a memory system of FIG. 1 generates a key index table and an encryption/decryption key table.

FIG. 3 is a diagram for describing some example embodiments in which a memory system of FIG. 1 generates a key index table and an encryption/decryption key table.

Referring to FIG. 3, the key index table KI_TBL and the encryption/decryption key table EDK_TBL may include entries (hereinafter referred to as "same or corresponding entries") which are identical to each other or correspond to each other, a logical address and an extended key index may be stored in each of the same or corresponding entries of the key index table KI_TBL, and a replicated key index and an encryption/decryption key associated with the logical address may be stored in the encryption/decryption key table EDK_TBL. For example, a logical address LA1 and an extended key index EKI1 may be stored in one entry of the key index table KI_TBL, and a replicated key index RKI1 and an encryption/decryption key EDKEY1 associated with the logical address LA1 may be stored in the same or corresponding entry of the encryption/decryption key table EDK_TBL. For example, a logical address LA2 and an extended key index EKI2 may be stored in one entry of the key index table KI_TBL, and a replicated key index RKI2 and an encryption/decryption key EDKEY2 associated with the logical address LA2 may be stored in the same or corresponding entry of the encryption/decryption key table EDK_TBL. As in the above description, a logical address LA(x−1) (x being an integer of 4 or more) and an extended key index EKI(x−1) may be stored in one entry of the key index table KI_TBL, and a replicated key index RKI(x−1) and an encryption/decryption key EDKEY(x−1) associated with the logical address LA(x−1) may be stored in the same or corresponding entry of the encryption/decryption key table EDK_TBL.

As illustrated in FIG. 3, an extended key index EKIx, a replicated key index RKIx, and an encryption/decryption key EDKEYx associated with a logical address LAx may be generated in the key index table KI_TBL and the encryption/decryption key table EDK_TBL. The extended key index EKIx may be stored in an entry where the logical address LAx of the key index table KI_TBL is stored. The replicated key index RKIx identical to the extended key index EKIx may be generated by replicating the extended key index EKIx (11) and may then be stored in the same or corresponding entry of the encryption/decryption key table EDK_TBL (13), and the encryption/decryption key EDKEYx may also be stored in an entry of the encryption/decryption key table EDK_TBL, in which the replicated key index RKIx is stored (15).

In some example embodiments, the process in which the logical address LAx, the extended key index EKIx, the replicated key index RKIx, and the encryption/decryption key EDKEYx are generated in the key index table KI_TBL and the encryption/decryption key table EDK_TBL may correspond to operation S100 described with reference to FIG. 2.

Figure 4:
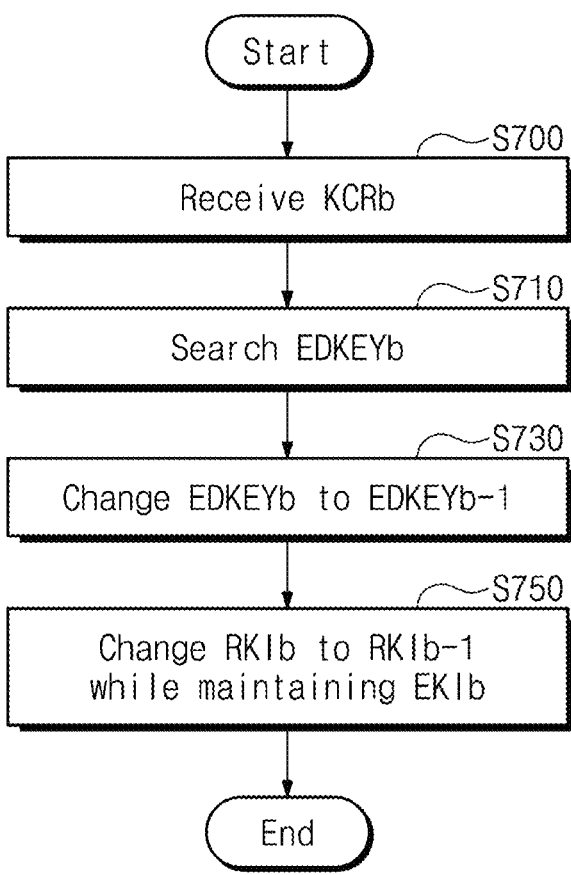
FIG. 4 is a flowchart for describing some example embodiments of an operation in which a memory system of FIG. 1 changes a replicated key index.

FIG. 4 is a flowchart for describing some example embodiments of an operation in which a memory system of FIG. 1 changes a replicated key index.

Referring to FIGS. 1, 3, and 4, an operation of changing a replicated key index may be performed by the memory controller 110.

A key change request KCRb may be received (S700).

An encryption/decryption key EDKEYb corresponding to the key change request KCRb may be found from the encryption/decryption key table EDK_TBL (S710).

The encryption/decryption key EDKEYb may be changed to an encryption/decryption key EDKEYb-1 based on the key change request KCRb (S730).

A replicated key index RKIb may be changed to a replicated key index RKIb-1 based on the key change request KCRb (S750).

In some example embodiments, as described with reference to FIG. 1, operation S700, operation S710, operation S730, and operation S750 may be independent of operation S100, operation S200, operation S300, operation S400, operation S500, operation S510, operation S530, operation S600, operation S610 of FIG. 2 and may be performed in parallel.

An example in which operation S730 is performed before operation S750 is illustrated in FIG. 4, but the present disclosure is not limited thereto. After operation S710 is performed, operation S750 may be performed, and operation S730 may then be performed. Alternatively, after operation S710 is performed, operation S730 and operation S750 may be performed in parallel.

Figure 5:
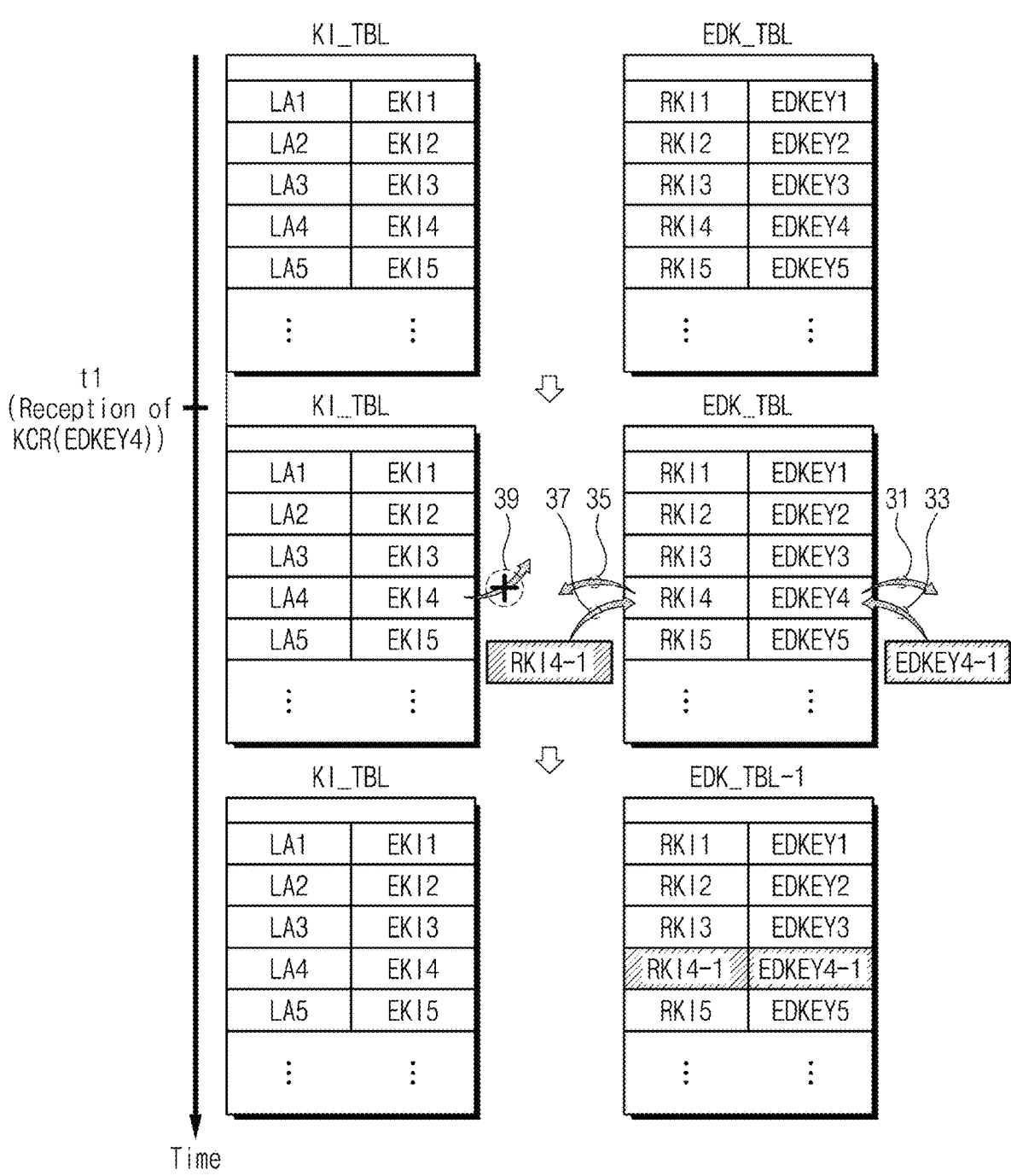
FIG. 5 is a diagram for describing some example embodiments of an operation of changing a replicated key index of FIG. 4.

FIG. 5 is a diagram for describing some example embodiments of an operation of changing a replicated key index of FIG. 4.

The key index table KI_TBL and the encryption/decryption key table EDK_TBL over time are illustrated in FIG. 5. Before a point in time t1, the key index table KI_TBL may include extended key indexes EKI1, EKI2, EKI3, EKI4, EKI5 corresponding to logical addresses LA1, LA2, LA3, LA4, and LA5, and the encryption/decryption key table EDK_TBL may include replicated key indexes RKI1, RKI2, RKI3, RKI4, and RKI5 and encryption/decryption keys EDKEY1, EDKEY2, EDKEY3, EDKEY4, and EDKEY5.

At the point in time t1, a key change request KCR requesting to change an encryption/decryption key (for example, encryption/decryption key EDKEY4) may be received from a host device.

Based on the key change request KCR, the encryption/decryption key EDKEY4 may be removed from the encryption/decryption key table EDK_TBL (31), and the encryption/decryption key EDKEY4 may be changed to an encryption/decryption key EDKEY4-1 (33).

Based on the key change request KCR, a replicated key index RKI4 may be removed from the encryption/decryption key table EDK_TBL (35), and the replicated key index RKI4 may be changed to the replicated key index RKI4-1 (37).

Even though an encryption/decryption key or a replicated key index is changed in the encryption/decryption key table EDK_TBL based on the key change request KCR, the key index table KI_TBL may not change. For example, even though an encryption/decryption key or a replicated key index is changed, an extended key index EKI4 may not be changed in the key index table KI_TBL (39).

As a result of performing the operations 31, 33, 35, 37, and 39, the key index table KI_TBL may be maintained, and the encryption/decryption key table EDK_TBL may be changed to an encryption/decryption key table EDK_TBL-1. The encryption/decryption key table EDK_TBL-1 may include the replicated key indexes RKI1 to RKI3, RKI4-1, and RKI5 and the encryption/decryption keys EDKEY1 to EDKEY3, EDKEY4-1, and EDKEY5 corresponding to the logical addresses LA1 to LA5.

Figure 6:
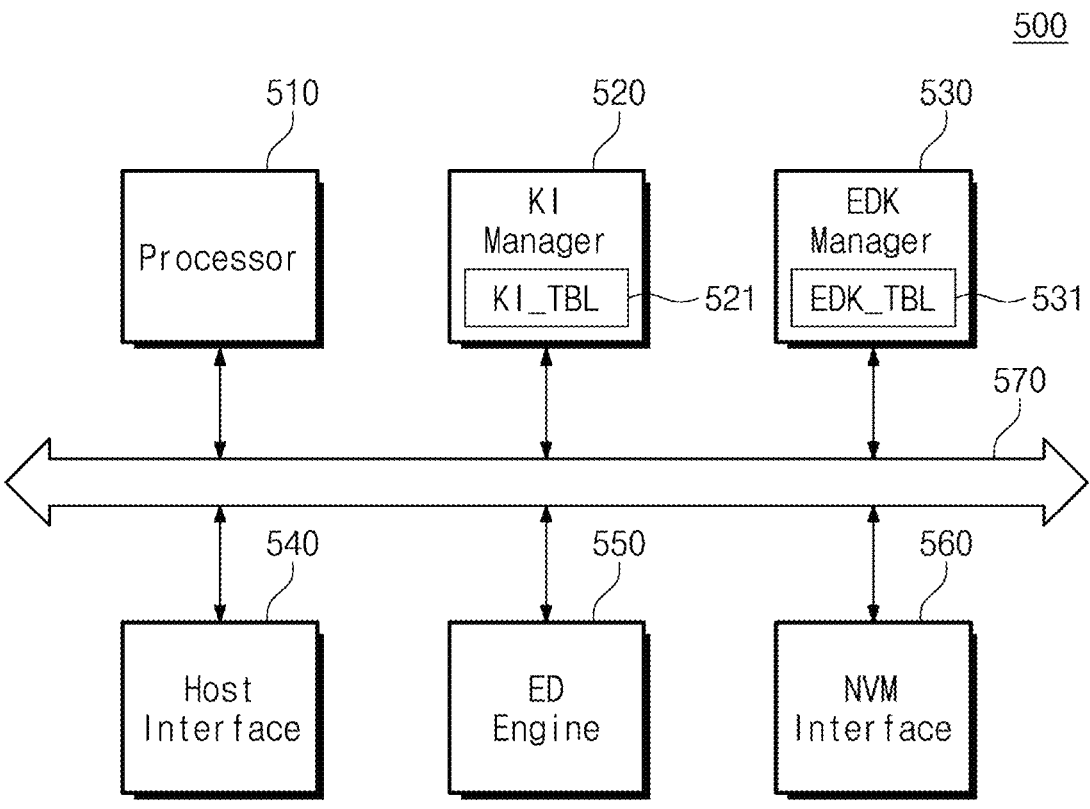
FIG. 6 is a block diagram illustrating some example embodiments of a memory controller of FIG. 1.

FIG. 6 is a block diagram illustrating some example embodiments of a memory controller of FIG. 1.

Referring to FIG. 6, a memory controller 500 may correspond to the memory controller 110 of FIG. 1.

The memory controller 500 may include a processor 510, a key index (KI) manager 520, an encryption/decryption key (EDK) manager 530, a host interface 540, an encryption/decryption (ED) engine 550, a non-volatile memory (NVM) interface 560, and a bus 570. The key index manager 520 may manage a key index table 521, and the encryption/decryption key manager 530 may manage an encryption/decryption key table 531. The key index table 521 and the encryption/decryption key table 531 may respectively correspond to the key index table KI_TBL and the encryption/decryption key table EDK_TBL described with reference to FIGS. 1 to 5.

The processor 510 may overall control the components 520, 521, 530, 531, 540, 550, 560, and 570 of the memory controller 500. The bus 570 may perform communication between the components 510, 520, 530, 540, 550, and 560.

When a request and a logical address are received through the host interface 540, the processor 510 may provide the logical address to the key index manager 520. The key index manager 520 may search an extended key index from the key index table 521 based on the logical address and may provide the extended key index to the encryption/decryption key manager 530. The encryption/decryption key manager 530 may search a replicated key index associated with the extended key index based on the extended key index and may compare the extended key index and the replicated key index.

Depending on whether the replicated key index is identical to the extended key index, the encryption/decryption key manager 530 may provide an encryption/decryption key associated with encryption or decryption to the encryption/decryption engine 550 or may provide a result message to the processor 510. The encryption/decryption engine 550 may perform encryption or decryption with respect to target data associated with the logical address based on the encryption/decryption key, and the processor 510 may output an error message associated with the result message.

The host interface 540 may perform communication between the memory controller 500 and an external host device, and the non-volatile memory interface 560 may perform communication between the memory controller 500 and a non-volatile memory device.

FIG. 7 is a flowchart illustrating a method of operating a memory system according to some example embodiments of the present disclosure.

In FIGS. 2 and 7, operations or components which are marked by the same reference numerals/signs may be substantially the same functions. Some example embodiments illustrated in FIG. 7 may be performed by the components 510, 520, 521, 530, 531, 540, 550, 560, and 570 included in the memory controller 500 of FIG. 6.

In the method of operating the memory system, the processor 510 may generate the key index table KI_TBL and the encryption/decryption key table EDK_TBL (S100). The processor 510 may receive the access request HARa including a logical address from a host device through the host interface 540 (S200).

The key index manager 520 may search the extended key index EKIa associated with the logical address from the key index table KI_TBL (S310); when the extended key index EKIa is found (Yes in operation S320), the key index manager 520 may provide the extended key index EKIa to the encryption/decryption key manager 530 (S340); when the extended key index EKIa is not found (No in operation S320), the key index manager 520 may notify the processor 510 that the extended key index EKIa is not found. When the extended key index EKIa is not found from the key index table KI_TBL, the processor 510 may update the key index table KI_TBL and the encryption/decryption key table EDK_TBL depending on the method described with reference to FIG. 3 (S330).

The encryption/decryption key manager 530 may receive the extended key index EKIa (S350) and may search the replicated key index RKIa associated with the extended key index EKIa from the encryption/decryption key table EDK_TBL (S360).

The encryption/decryption key manager 530 may determine whether the replicated key index RKIa is identical to the extended key index EKIa (S400).

When the replicated key index RKIa is identical to the extended key index EKIa (Yes in operation S400), the encryption/decryption key manager 530 may determine that the encryption/decryption key EDKEYa is not changed (S500) and may provide the encryption/decryption key EDKEYa to the encryption/decryption engine 550 (S500-1). In this case, the encryption/decryption engine 550 may perform encryption or decryption based on the encryption/decryption key EDKEYa (S510) and may output encrypted data or decrypted data (S530).

When the replicated key index RKIa is different from the extended key index EKIa (No in operation S400), the encryption/decryption key manager 530 may determine that the encryption/decryption key EDKEYa is changed (S600) and may provide the processor 510 with a result message RES indicating the mismatch of the replicated key index RKIa and the extended key index EKIa (S600-1), and the processor 510 may output an error message associated with the result message RES (S610).

Figure 8A:
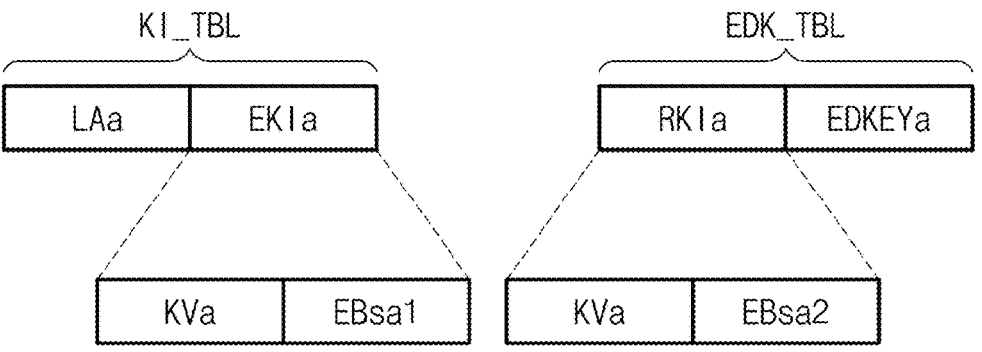
FIG. 8A is a diagram illustrating some example embodiments of an extended key index and a replicated key index of FIG. 1.

FIG. 8A is a diagram illustrating some example embodiments of an extended key index and a replicated key index of FIG. 1.

In FIG. 8A, the key index table KI_TBL may include the logical address LAa and the extended key index EKIa, and the encryption/decryption key table EDK_TBL may include the replicated key index RKIa and the encryption/decryption key EDKEYa associated with the extended key index EKIa.

Referring to FIG. 8A, the extended key index EKIa may further include a key value KVa and first extension bits EBsa1, and the replicated key index RKIa may further include the key value KVa and second extension bits EBsa2.

In some example embodiments illustrated in FIG. 8A, the key value KVa included in the replicated key index RKIa may be identical to the key value KVa included in the extended key index EKIa, and the second extension bits EBsa2 may be identical to the first extension bits EBsa1 at a point in time when the extended key index EKIa and the replicated key index RKIa are generated in the key index table KI_TBL and the encryption/decryption key table EDK_TBL for the first time.

Figure 8B:
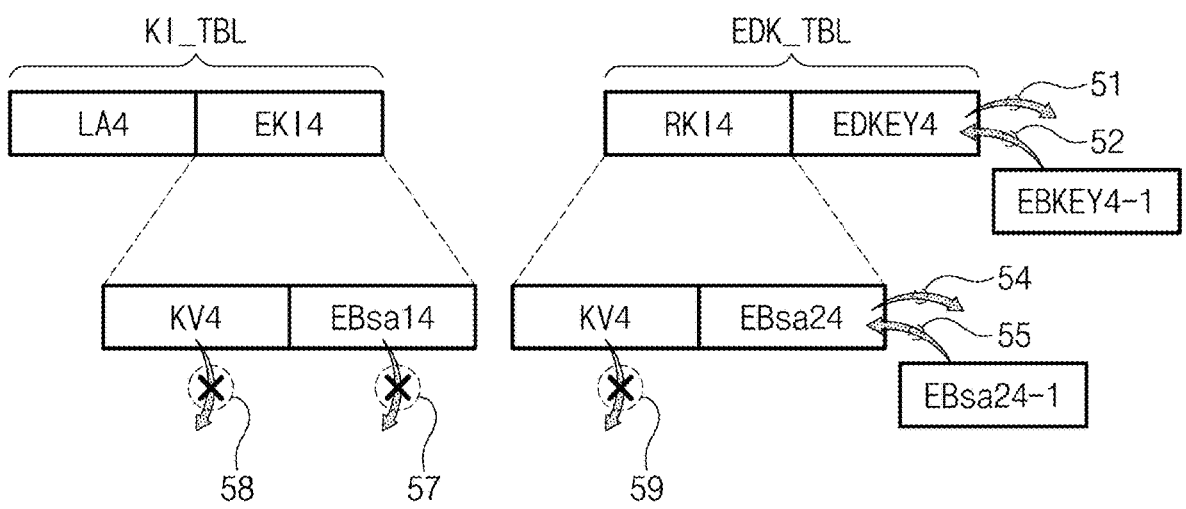
FIG. 8B is a diagram for describing how an extended key index and a replicated key index of FIG. 8A are maintained or changed when a key change request is received.

FIG. 8B is a diagram for describing how an extended key index and a replicated key index of FIG. 8A are maintained or changed when a key change request is received.

In FIG. 8B, the extended key index EKIa and the replicated key index RKIa may be configured as illustrated in FIG. 8A. In this case, there are illustrated operations of changing the encryption/decryption key EDKEY4 and the replicated key index RKI4, which are described with reference to FIG. 5.

Referring to FIG. 8B, the key index table KI_TBL may include a logical address LA4 and the extended key index EKI4, and the encryption/decryption key table EDK_TBL may include the replicated key index RKI4 and the encryption/decryption key EDKEY4 associated with the extended key index EKI4.

The extended key index EKI4 may further include a key value KV4 and first extension bits EBsa14, and the replicated key index RKI4 may further include the key value KV4 and second extension bits EBsa24.

As described with reference to FIG. 5, at any point in time, a key change request requesting to change an encryption/decryption key (for example, encryption/decryption key EDKEY4) may be received from any host device.

Based on the key change request, the encryption/decryption key EDKEY4 may be removed from the encryption/decryption key table EDK_TBL (51), and the encryption/decryption key EDKEY4 may be changed to the encryption/decryption key EDKEY4-1 (52).

Based on the key change request, the second extension bits EBsa24 may be removed from the encryption/decryption key table EDK_TBL (54), and the second extension bits EBsa24 may be changed to second extension bits EBsa24-1 (S55).

Even though an encryption/decryption key or second extension bits are changed in the encryption/decryption key table EDK_TBL depending on the key change request, the first extension bits EBsa14 of the key index table KI_TBL may not be changed (57); also, the key value KV4 of the key index table KI_TBL and the key value KV4 of the encryption/decryption key table EDK_TBL may not be changed (58 and 59).

As a result of performing the operations 51, 52, 54, 55, 57, 58, and 59, the key index table KI_TBL may be maintained, and the encryption/decryption key table EDK_TBL may be changed.

Figure 8C:
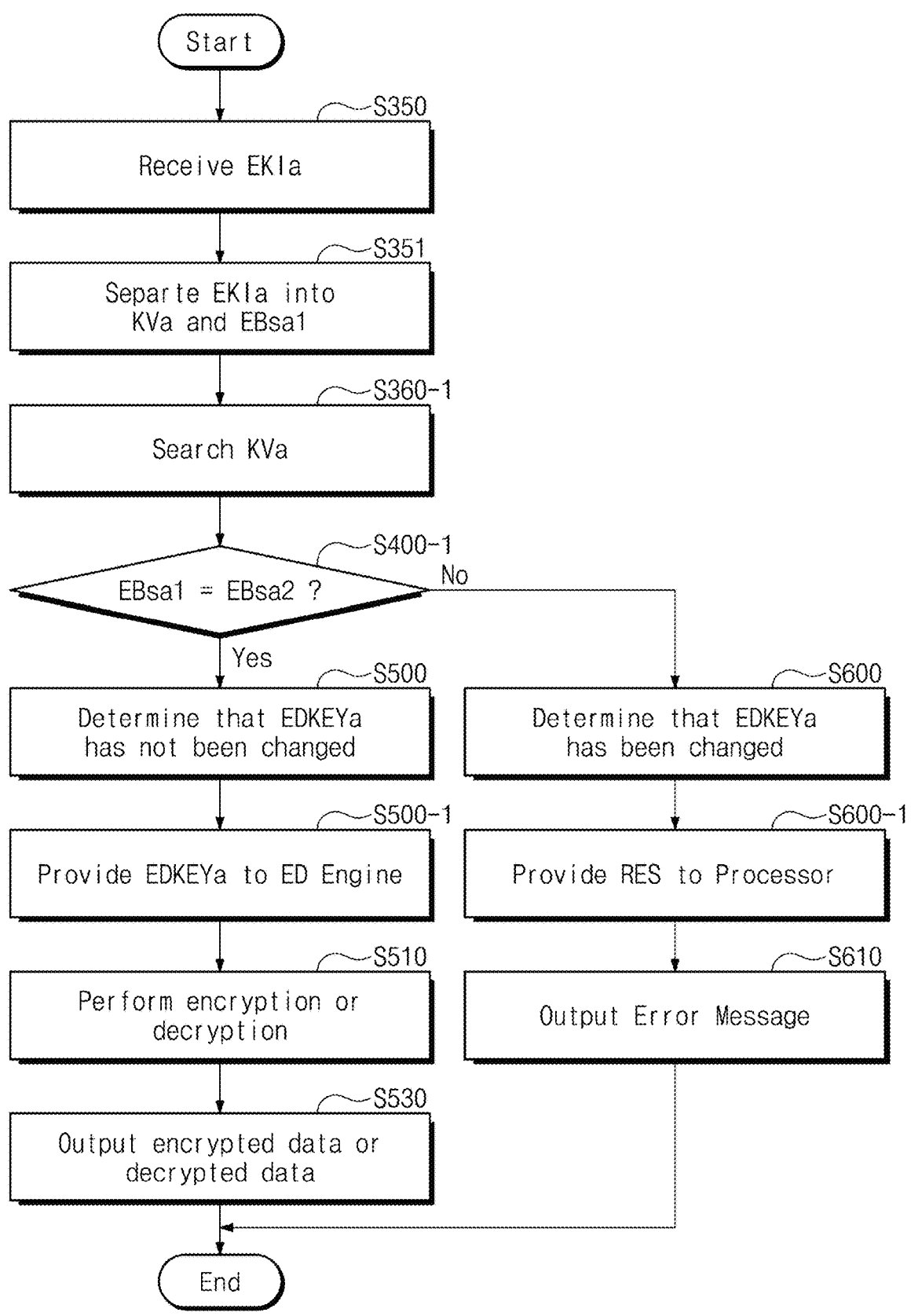
FIG. 8C is a flowchart illustrating a method of operating a memory system according to some example embodiments of the present disclosure.

FIG. 8C is a flowchart illustrating a method of operating a memory system according to some example embodiments of the present disclosure.

In FIG. 8C, the extended key index EKIa and the replicated key index RKIa may be configured as illustrated in FIG. 8A and may be maintained or changed as illustrated in FIG. 8B.

In this case, referring to FIGS. 7 and 8C, operations or components which are marked by the same reference numerals/signs may be substantially the same functions. Some example embodiments illustrated in FIG. 8C may be performed by the components 510, 520, 521, 530, 531, 540, 550, 560, and 570 included in the memory controller 500 of FIG. 6. For convenience of description, even though omitted, operation S100, operation S200, operation S310, operation S320, operation S330, operation S340 of FIG. 7 may be performed before operation S350 of FIG. 8C.

In the method of operating the memory system, the encryption/decryption key manager 530 may receive the extended key index EKIa (S350).

The encryption/decryption key manager 530 may separate the extended key index EKIa into the key value KVa and the first extension bits EBsa1 (S351) and may search the same key value as the key value KVa of the extended key index EKIa from the encryption/decryption key table EDK_TBL (S360-1).

In some example embodiments, an entry of the encryption/decryption key table EDK_TBL, in which the replicated key index RKIa is stored and an entry of the key index table KI_TBL, in which the extended key index EKIa is stored, may be identical to each other or may correspond to each other. The memory system may quickly search the same key value as the key value KVa of the extended key index EKIa by identifying a specific entry of the key index table KI_TBL, which is identical to or correspond to the entry where the extended key index EKIa (or the key value KVa) is stored, from the encryption/decryption key table EDK_TBL.

The encryption/decryption key manager 530 may determine whether the second extension bits EBsa2 are identical to the first extension bits EBsa1 (S400-1).

When the second extension bits EBsa2 are identical to the first extension bits EBsa1 (Yes in operation S400-1), the encryption/decryption key manager 530 may determine that the encryption/decryption key EDKEYa is not changed (S500) and may provide the encryption/decryption key EDKEYa to the encryption/decryption engine 550 (S500-1). In this case, the encryption/decryption engine 550 may perform encryption or decryption based on the encryption/decryption key EDKEYa (S510) and may output encrypted data or decrypted data (S530).

When the second extension bits EBsa2 are different from the first extension bits EBsa1 (No in operation S400-1), the encryption/decryption key manager 530 may determine that the encryption/decryption key EDKEYa is changed (S600) and may provide the processor 510 with the result message RES indicating the mismatch of the replicated key index RKIa and the extended key index EKIa (S600-1), and the processor 510 may output an error message associated with the result message RES (S610).

Figure 9:
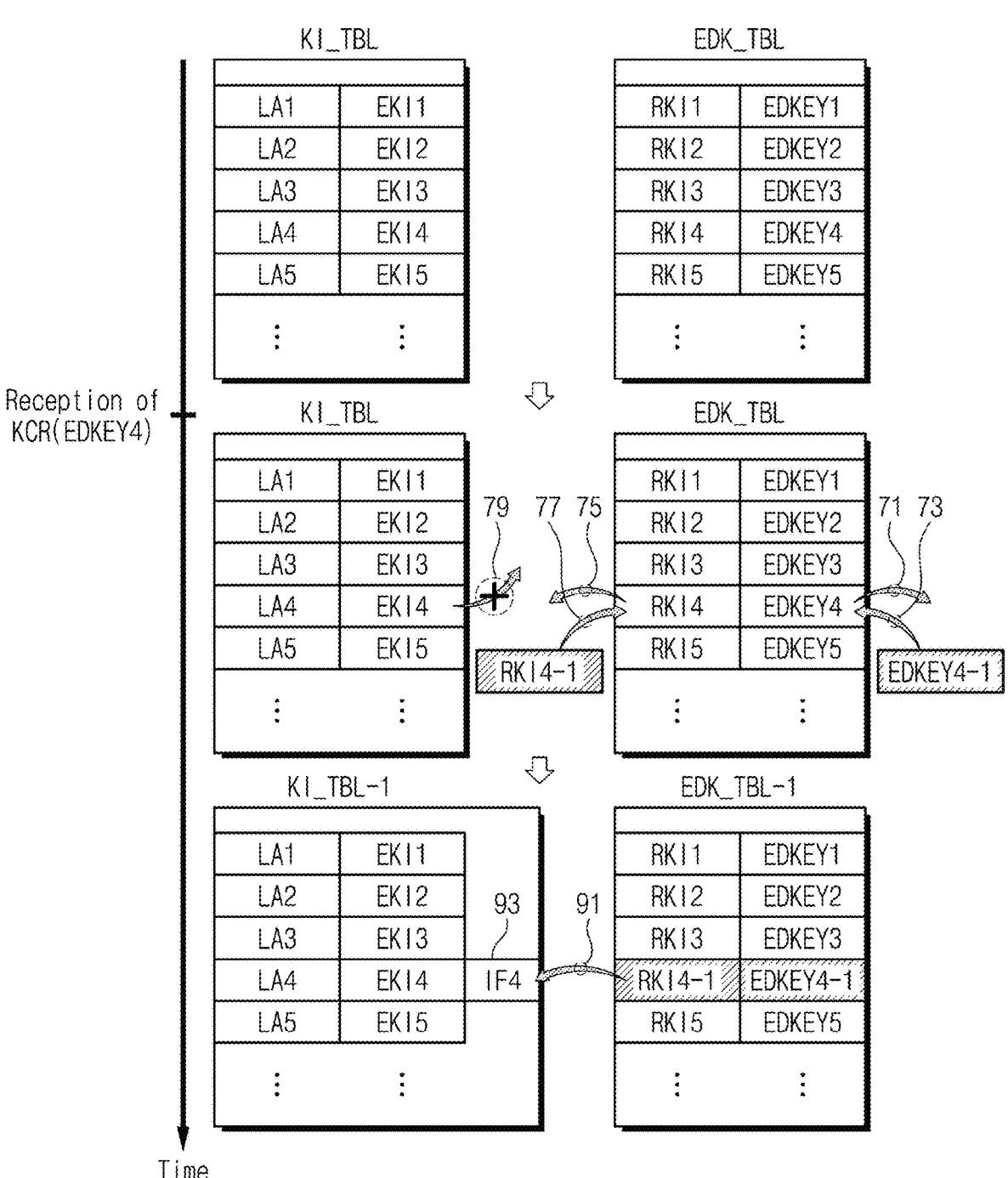
FIG. 9 is a diagram for describing some example embodiments of a key index table of FIG. 1, which further includes an indicator flag.

FIG. 9 is a diagram for describing some example embodiments of a key index table of FIG. 1, which further includes an indicator flag.

The key index table KI_TBL and the encryption/decryption key table EDK_TBL over time are illustrated in FIG. 9. Before the point in time t1, the key index table KI_TBL may include extended key indexes EKI1, EKI2, EKI3, EKI4, and EKI5 corresponding to logical addresses LA1, LA2, LA3, LA4, and LA5, and the encryption/decryption key table EDK_TBL may include replicated key indexes RKI1, RKI2, RKI3, RKI4, and RKI5 and encryption/decryption keys EDKEY1, EDKEY2, EDKEY3, EDKEY4, and EDKEY5.

At the point in time t1, the key change request KCR requesting to change an encryption/decryption key (for example, encryption/decryption key EDKEY4) may be received from any host device.

Based on the key change request KCR, the encryption/decryption key EDKEY4 may be removed from the encryption/decryption key table EDK_TBL (71), and the encryption/decryption key EDKEY4 may be changed to the encryption/decryption key EDKEY4-1 (73).

Based on the key change request KCR, the replicated key index RKI4 may be removed from the encryption/decryption key table EDK_TBL (75), and the replicated key index RKI4 may be changed to the replicated key index RKI4-1 (77).

Even though an encryption/decryption key or a replicated key index is changed in the encryption/decryption key table EDK_TBL depending on the key change request KCR, the key index table KI_TBL may not change. For example, even though an encryption/decryption key or a replicated key index is changed, the extended key index EKI4 may not be changed in the key index table KI_TBL (79).

In some example embodiments, the operations 71, 73, 75, 77, and 79 may be substantially the same as the operations 31, 33, 35, 37, and 39 described with reference to FIG. 5 or the operations 51, 52, 54, 55, 57, 58, and 59 described with reference to FIG. 8B.

As a result of performing the operations 71, 73, 75, 77, and 79, the encryption/decryption key table EDK_TBL may be changed to the encryption/decryption key table EDK_TBL-1. The encryption/decryption key table EDK_TBL-1 may include the replicated key indexes RKI1 to RKI3, RKI4-1, and RKI5 and the encryption/decryption keys EDKEY1 to EDKEY3, EDKEY4-1, and EDKEY5 corresponding to the logical addresses LA1 to LA5.

Unlike some example embodiments as illustrated in FIG. 5, as a result of performing the operations 71, 73, 75, 77, and 79, the key index table KI_TBL may further include an indicator flag IF4 indicating the mismatch of the replicated key index RKI4-1 and the extended key index EKI4 (or the mismatch of second extension bits (for example, the second extension bits EBsa24-1 of FIG. 8B) and first extension bits (e.g., the first extension bits Ebsa14 of FIG. 8B)) (93).

In some example embodiments, a memory controller (for example, the memory controller 110 of FIG. 1 or the memory controller 500 of FIG. 6) or a key index manager (for example, the key index manager 520 of FIG. 6) may perform the operation 75 such that the replicated key index RKI4-1 is stored in the encryption/decryption key table EDK_TBL-1 (91) and may then set the indicator flag IF4 to the same entry as the extended key index EKI4 of the key index table KI_TBL-1.

In some example embodiments, instead of performing operation S400 of FIG. 2, operation S400 of FIG. 7, or operation S400-1 of FIG. 8C, the memory controller may determine whether an encryption/decryption key associated with encryption or decryption is changed, based on the indicator flag IF4.

In some example embodiments, the indicator flag IF4 may have one of a first value and a second value. When the indicator flag IF4 indicates the first value, the memory controller may perform encryption or decryption with respect to target data based on the encryption/decryption key associated with the encryption or the decryption; when the indicator flag IF4 indicates the second value, the memory controller may output an error message.

Figure 10:
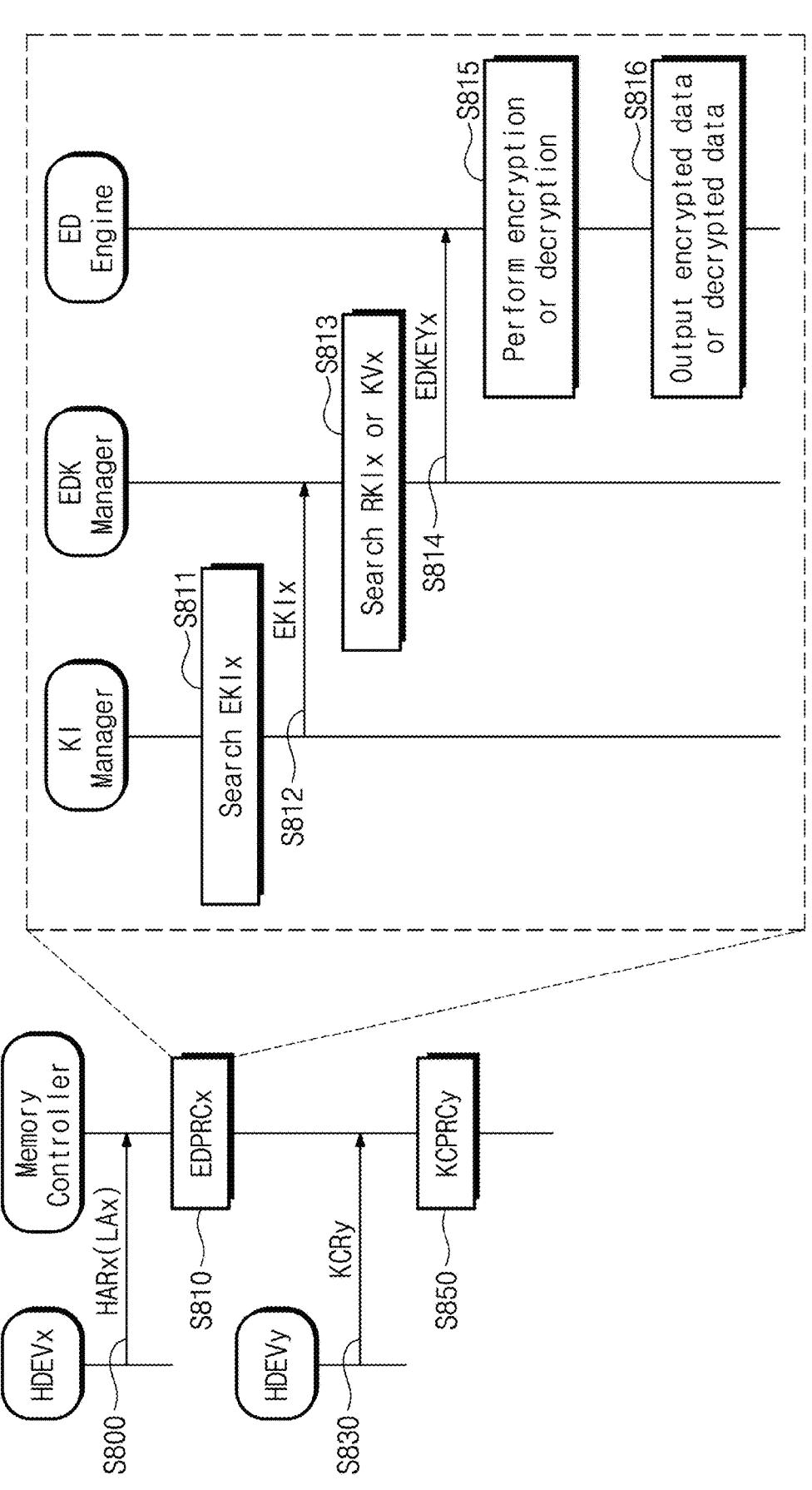
FIGS. 10 and 11 are diagrams for describing a method of operating a memory system according to the related art for the purpose of describing technical effects of a memory system according to some example embodiments of the present disclosure.
Figure 11:
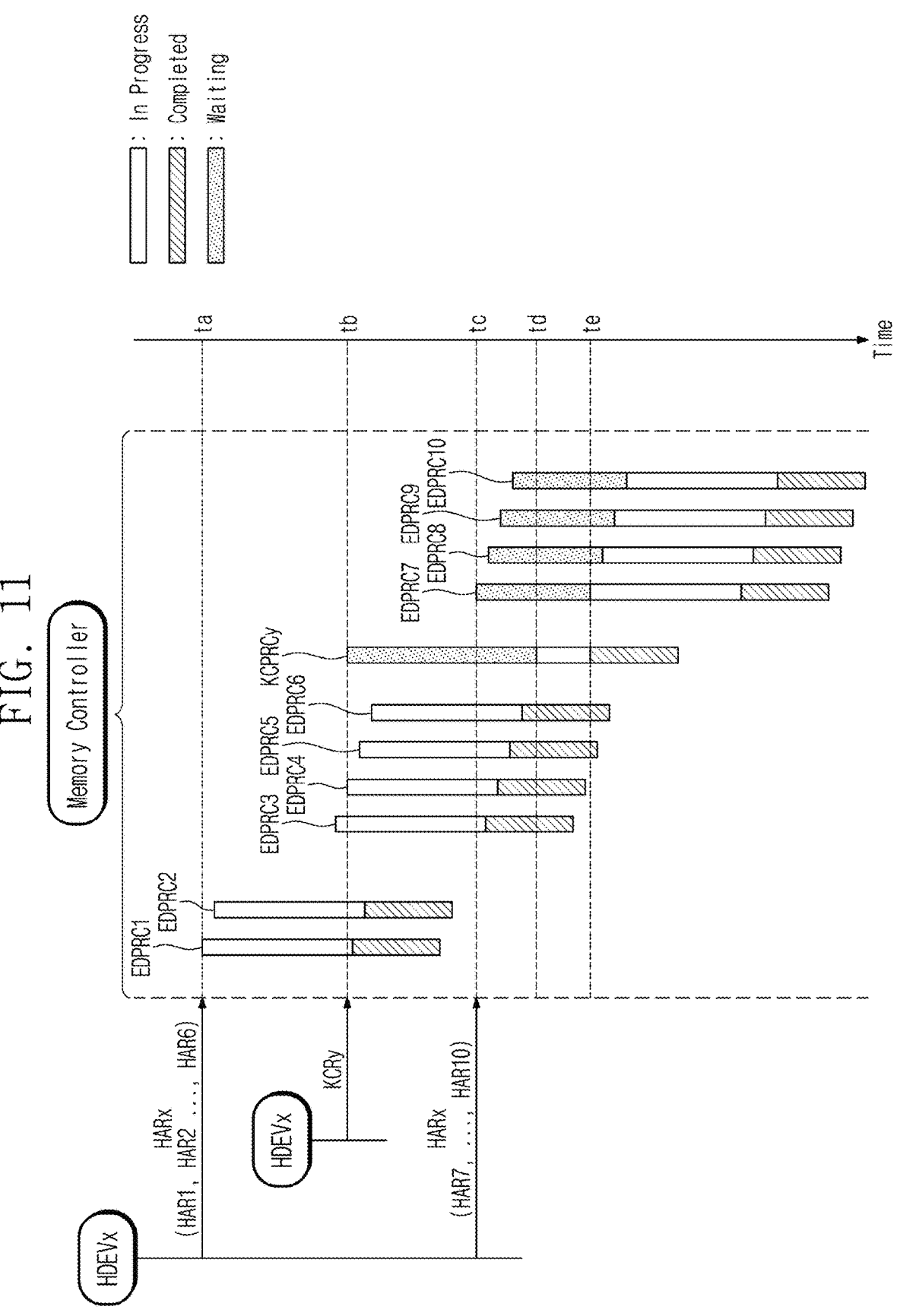

FIGS. 10 and 11 are diagrams for describing a method of operating a memory system according to the related art for the purpose of describing technical effects of a memory system according to some example embodiments of the present disclosure.

Host devices HDEVx and HDEVy and a memory controller are illustrated in FIGS. 10 and 11. The host devices HDEVx and HDEVy and the memory controller may operate according to the related art.

Referring to FIG. 10, the host device HDEVx may transmit an access request HARx including a logical address LAx to the memory controller (S800), and the memory controller may perform an encryption/decryption procedure EDPRCx according to the access request HARx (S810). The host device HDEVy may transmit a key change request KCRy to the memory controller (S830), and the memory controller may perform a key change procedure KCPRCy according to the key change request KCRy (S850).

In some example embodiments, the memory controller may include a key index (KI) manager, an encryption/decryption key (EDK) manager, and an encryption/decryption (ED) engine. In the processing the encryption/decryption procedure EDPRCx, the KI manager may search an extended key index EKIx (S811) and may provide the extended key index EKIx to the EDK manager (S812). The EDK manager may search a replicated key index RKIx or a key value KVx (S813) and may provide an encryption/decryption key EDKEYx to the ED engine (S814). The ED engine may perform encryption or decryption (S815) and may output encrypted data or decrypted data (S816).

In FIG. 10, for convenience of description, the encryption/decryption procedure EDPRCx according to the related art is described by using operation S811, operation S812, operation S813, operation S814, operation S815, and operation S816, but it may be understood by one skilled in the art that the encryption/decryption procedure EDPRCx according to the related art may further include additional operations.

Referring to FIG. 11, point in times ta, tb, tc, td, and the may sequentially progress over time. The host device HDEVx may transmit the access request HARx including requests HAR1, . . . , HAR6 at the point in time ta and may transmit the access request HARx including requests HAR7, . . . , HAR10 at the point in time tc. At the point in time tb between the points in time ta and tc, the host device HDEVy may transmit the key change request KCRy to the memory controller.

In this case, an encryption/decryption procedure EDPRC1 according to the request HAR1 may be initiated from the point in time ta, and encryption/decryption procedures EDPRC2, EDPRC3, EDPRC4, EDPRC5, and EDPRC6 according to the requests HAR2, . . . , HAR6 may be sequentially initiated as illustrated in FIG. 11.

Even though the key change request KCRy is received at the point in time tb, the memory controller may fail to initiate the key change procedure KCPRCy according to the key change request KCRy until all the encryption/decryption procedures EDPRC1 to EDPRC6 according to the access request HARx received before the point in time tb are completely performed (i.e., until the point in time td).

Even though the access request HARx including the requests HAR7, . . . , HAR10 is received at the point in time tc, the memory controller may fail to initiate encryption/decryption procedures EDPRC7, EDPRC8, EDPRC9, and EDPRC10 according to the access request HARx until the key change procedure KCPRCy according to the key change request KCRy received before the point in time tc is completely performed (i.e., until the point in time the) (i.e., while waiting).

Accordingly, the key change request KCRy transmitted to the memory controller at the point in time tb may be delayed until the point in time td, and the access request HARx transmitted to the memory controller at the point in time tc may also be subsequently delayed.

However, a memory system according to some example embodiments of the present disclosure may immediately (for example, as soon as, or shortly thereafter) detect whether an encryption/decryption key is changed by only comparing an extended key index and a replicated key index, and based on a result of the detection, the memory system may perform encryption or decryption or may output an error message. Accordingly, the memory system according to some example embodiments of the present disclosure may efficiently process an access request from a first host device and a key change request from a second host device, thus, delays due to the access request or the key change request may be effectively reduced.

For example, according to some example embodiments, there may be an increase in speed, accuracy, and/or power efficiency of the memory device based on the above methods. Therefore, the improved devices and methods overcome the deficiencies of the conventional devices and methods of managing data and data security related to multiple host devices and a memory device while reducing resource consumption, improving data accuracy, and resource allocation (e.g., latency). Further, there is an improvement in communication and reliability in the device by providing the abilities disclosed herein.

Figure 12:
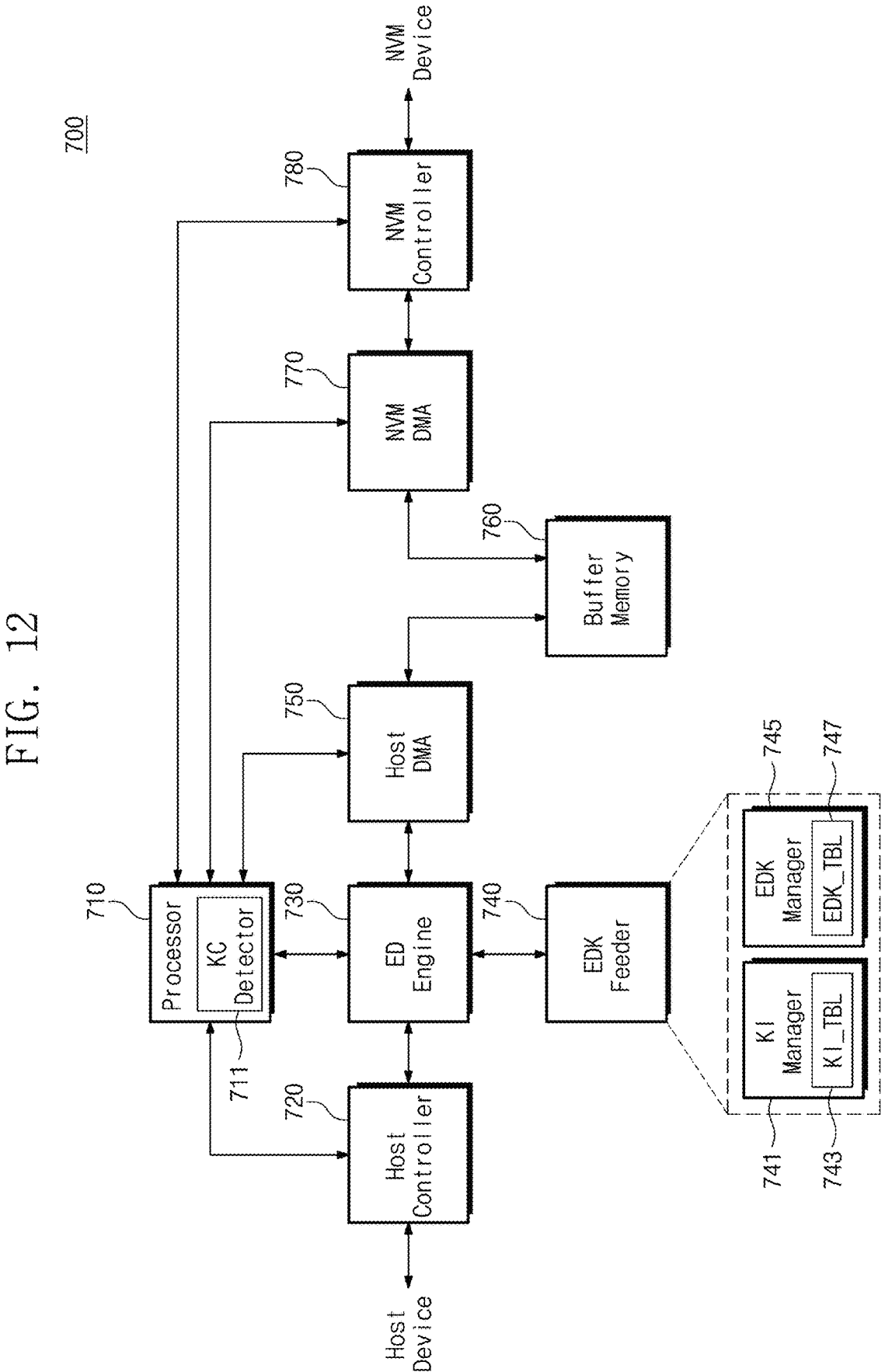
FIG. 12 is a block diagram illustrating some example embodiments of a memory controller of FIG. 1.

FIG. 12 is a block diagram illustrating some example embodiments of a memory controller of FIG. 1.

Referring to FIG. 12, a memory controller 700 may correspond to the memory controller 110 of FIG. 1.

The memory controller 700 may include a processor 710, a host controller 720, an encryption/decryption (ED) engine 730, an encryption/decryption key (EDK) feeder 740, a host DMA 750, a buffer memory 760, an NVM DMA 770, and an NVM controller 780. The processor 710 may include a key change (KC) detector 711, and the EDK feeder 740 may include a key index manager 741 including a key index table 743 and an encryption/decryption key manager 745 including an encryption/decryption key table 747.

The host controller 720 may perform communication between a host device and the memory controller 700, and the NVM controller 780 may perform communication between the memory controller 700 and an NVM device. The host DMA 750 may perform communication between the ED engine 730 and the buffer memory 760, and the NVM DMA 770 may perform communication between the buffer memory 760 and the NVM controller 780.

In some example embodiments, the processor 710, the host controller 720, and the NVM controller may respectively correspond to the processor 510, the host interface 540, and the NVM interface 560 of FIG. 6. The EDK feeder 740 may correspond to both the key index manager 520 and the encryption/decryption key manager 530 of FIG. 6. The ED engine 730 may correspond to the encryption/decryption engine 550 of FIG. 6.

In some example embodiments, the EDK feeder 740 may provide an encryption/decryption key to the ED engine 730 depending on the method described with reference to FIGS. 1 to 7, 8A, 8B, 8C, and 9, and the ED engine 730 may perform arbitrary encryption or decryption, such as DES (Data Encryption Standard) or AES (Advanced Encryption Standard), based on the encryption/decryption key provided from the EDK feeder 740.

In some example embodiments, the buffer memory 760 may temporarily store data which are provided from the host device and are then encrypted by the ED engine 730 or may temporarily store encrypted data provided from the NVM device.

In some example embodiments, when the encryption/decryption key manager 745 determines that the encryption/decryption key is changed, the encryption/decryption key manager 745 may provide the processor 710 with the result message RES indicating the mismatch of a replicated key index and an extended key index (or the mismatch of first extension bits and second extension bits). The key change detector 711 may output an error message associated with the result message RES. For example, the key change detector 711 may detect whether internal information (for example, an encryption/decryption key, a replicated key index, or second extension bits) included in the encryption/decryption key table 747 is changed.

Figure 13:
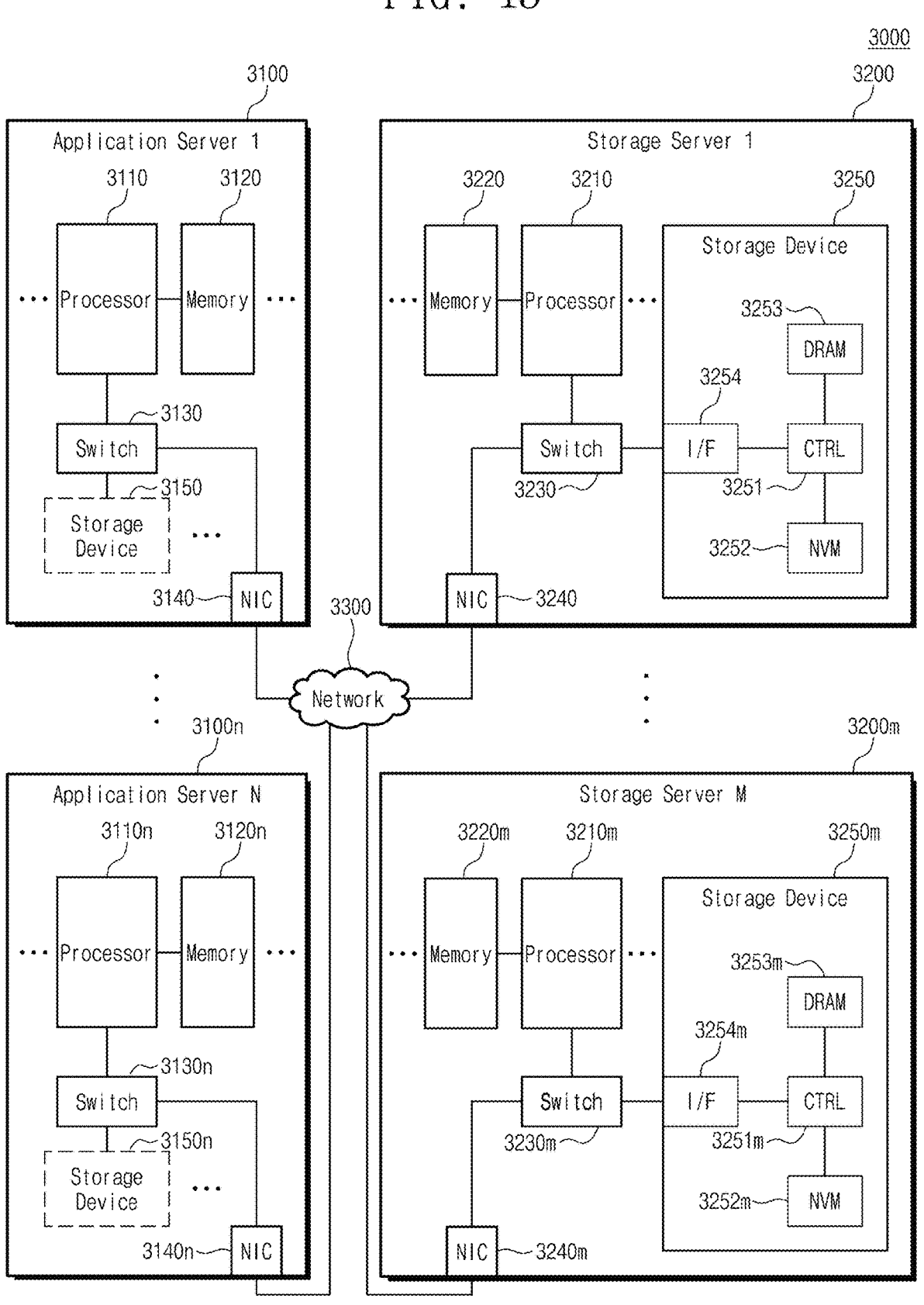
FIG. 13 is a block diagram illustrating a data center including a memory system according to some example embodiments of the present disclosure.

FIG. 13 is a diagram illustrating a data center including the memory system according to some example embodiments of the present disclosure.

Referring to FIG. 13, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to some example embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In some example embodiments, the processor 3210 and the memory 3220 may provide a processor-memory pair. In some example embodiments, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to some example embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In some example embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCOE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In some example embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230, and the storage device 3250.

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In some example embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy. Some or all of the storage devices 3150 to 3150n and 3250 to 3250m may be the memory system according to some example embodiments of the present disclosure. Some or all of the application servers 3100 to 3100n may be the host devices referred to in the process of describing the memory system according to some example embodiments of the present disclosure. However, the present disclosure is not limited thereto. Accordingly, some or all of the storage devices 3150 to 3150n and 3250 to 3250m may efficiently process an access request from a first application processor among the application servers 3100 to 3100n and a key change request from a second application processor among the application servers 3100 to 3100n.

As described above, a memory system according to some example embodiments of the present disclosure may independently manage an extended key index and a replicated key index associated with a specific logical address in different tables. When an access request associated with a specific logical address is received from a first host device, the memory system may perform encryption or decryption with respect to pieces of data associated with the logical address based on an extended key index and a replicated key index associated with the logical address When an encryption/decryption key associated with the encryption or the decryption is changed depending on a key change request from a second host device, the memory system may compare the extended key index and the replicated key index and may immediately detect whether the encryption/decryption key is changed. Based on a result of the detection, the memory system may continuously perform the encryption or the decryption or may output an error message. The operation in which the memory system outputs the error message may satisfy the standard specification associated with the memory system. Accordingly, the memory system may efficiently process the access request from the first host device and the key change request from the second host device and may efficiently reduce delays due to the access request or the key change request.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. A memory system comprising:

a non-volatile memory device; and a memory controller configured to control the non-volatile memory device, the memory controller including a key index table including an extended key index associated with a logical address from a host device; and an encryption/decryption key table including a replicated key index associated with the extended key index, and an encryption/decryption key associated with encryption or decryption of target data associated with the logical address, and the memory controller being configured to change the replicated key index based on a key change request for the encryption/decryption key; and based on the encryption or the decryption being performed with respect to the target data, compare the extended key index and the replicated key index to detect whether the encryption/decryption key associated with the encryption or the decryption is changed.

2. The memory system of claim 1, wherein the memory controller is configured to:

generate the replicated key index identical to the extended key index based on the memory controller generating the extended key index associated with the logical address; and change the replicated key index while maintaining the extended key index, based on the key change request having been received.

3. The memory system of claim 2, wherein the memory controller is configured to:

change the encryption/decryption key while changing the replicated key index.

4. The memory system of claim 1, wherein the memory controller is configured to:

based on a result of comparing the extended key index and the replicated key index indicating that the extended key index and the replicated key index are different, determine that the encryption/decryption key associated with the encryption or the decryption is changed and output an error message.

5. The memory system of claim 4, wherein the memory controller is configured to:

based on the result of comparing the extended key index and the replicated key index indicating that the extended key index is identical to the replicated key index, perform the encryption or the decryption with respect to the target data based on the encryption/decryption key associated with the encryption or the decryption.

6. The memory system of claim 1, wherein the extended key index includes a key value and one or more first extension bits, the replicated key index includes the key value and one or more second extension bits, and the memory controller is configured to change the one or more second extension bits while maintaining the one or more first extension bits, based on the key change request having been received.

7. The memory system of claim 6, wherein the memory controller is configured to:

based on the encryption or the decryption of the target data being performed, compare the extended key index and the replicated key index by comparing the one or more second extension bits and the one or more first extension bits.

8. The memory system of claim 7, wherein the memory controller is configured to:

based on the one or more second extension bits being different from the one or more first extension bits, determine that the encryption/decryption key associated with the encryption or the decryption is changed and output an error message.

9. The memory system of claim 8, wherein the memory controller is configured to:

based on the one or more second extension bits being identical to the one of more first extension bits, perform the encryption or the decryption with respect to the target data based on the encryption/decryption key associated with the encryption or the decryption.

10. The memory system of claim 6, wherein the memory controller is configured to:

based on the one or more second extension bits being changed, set an indicator flag indicating a mismatch of the one or more first extension bits and the one or more second extension bits to a relevant entry of the key index table.

11. The memory system of claim 1, wherein the key index table further includes an indicator flag indicating a mismatch of the replicated key index and the extended key index, and the memory controller is configured to detect whether the encryption/decryption key associated with the encryption or the decryption is changed, based on the indicator flag, instead of comparing the extended key index and the replicated key index.

12. The memory system of claim 11, wherein the memory controller is configured to:

based on the indicator flag indicating a first value, perform the encryption or the decryption with respect to the target data based on the encryption/decryption key associated with the encryption or the decryption; and based on the indicator flag indicating a second value, output an error message.

13. The memory system of claim 1, wherein the memory controller further includes:

a key index manager configured to manage the key index table; and an encryption/decryption key manager configured to manage the encryption/decryption key table.

14. The memory system of claim 1, wherein the key change request is transmitted from another host device distinguished from the host device to the memory system.

15. A memory system comprising:

a non-volatile memory device; and a memory controller configured to control the non-volatile memory device, the memory controller including a key index manager configured to manage a key index table including an extended key index associated with a logical address from a host device;

an encryption/decryption key manager configured to manage an encryption/decryption key table including a replicated key index associated with the extended key index, and an encryption/decryption key associated with encryption or decryption of target data associated with the logical address;

an encryption/decryption engine configured to perform the encryption or the decryption of the target data based on the encryption/decryption key; and a processor configured to, based on the encryption or the decryption of the target data being performed, detect whether the replicated key index is changed, based on one or more first extension bits of the extended key index and one or more second extension bits of the replicated key index, to detect whether the encryption/decryption key associated with the encryption or the decryption is changed.

16. The memory system of claim 15, wherein the key index manager is configured to:

search the encryption/decryption key associated with the logical address from the key index table; and based on the extended key index being found, provide the extended key index to the encryption/decryption key manager, and the encryption/decryption key manager is configured to:

search the replicated key index associated with the extended key index from the encryption/decryption key table; and based on the replicated key index being identical to the extended key index, provide the encryption/decryption key associated with the encryption or the decryption to the encryption/decryption engine.

17. The memory system of claim 16, wherein the encryption/decryption key manager is configured to:

based on the replicated key index being different from the extended key index, provide a result message indicating a mismatch of the replicated key index and the extended key index to the processor.

18. The memory system of claim 15, wherein the extended key index includes a key value, the replicated key index includes the key value, and the processor is configured to change the one or more second extension bits while maintaining the one or more first extension bits, based on a key change request being received.

19. The memory system of claim 18, wherein, based on the encryption or the decryption of the target data being performed, the processor is configured to compare the extended key index and the replicated key index by comparing the one or more second extension bits and the one or more first extension bits.

20. A method of operating a memory system, the method comprising:

generating a key index table and an encryption/decryption key table, the key index table including an extended key index associated with a logical address from a host device, and the encryption/decryption key table including a replicated key index associated with the extended key index and an encryption/decryption key associated with encryption or decryption of target data associated with the logical address;

changing the replicated key index based on a key change request for the encryption/decryption key; and based on the encryption or the decryption of the target data being performed, compare the extended key index and the replicated key index to detect whether the encryption/decryption key associated with the encryption or the decryption is changed.

* * * * *